March 30, 1937.　　　W. F. McKAY　　　2,075,740
DUPLEX VALVE
Filed March 28, 1934
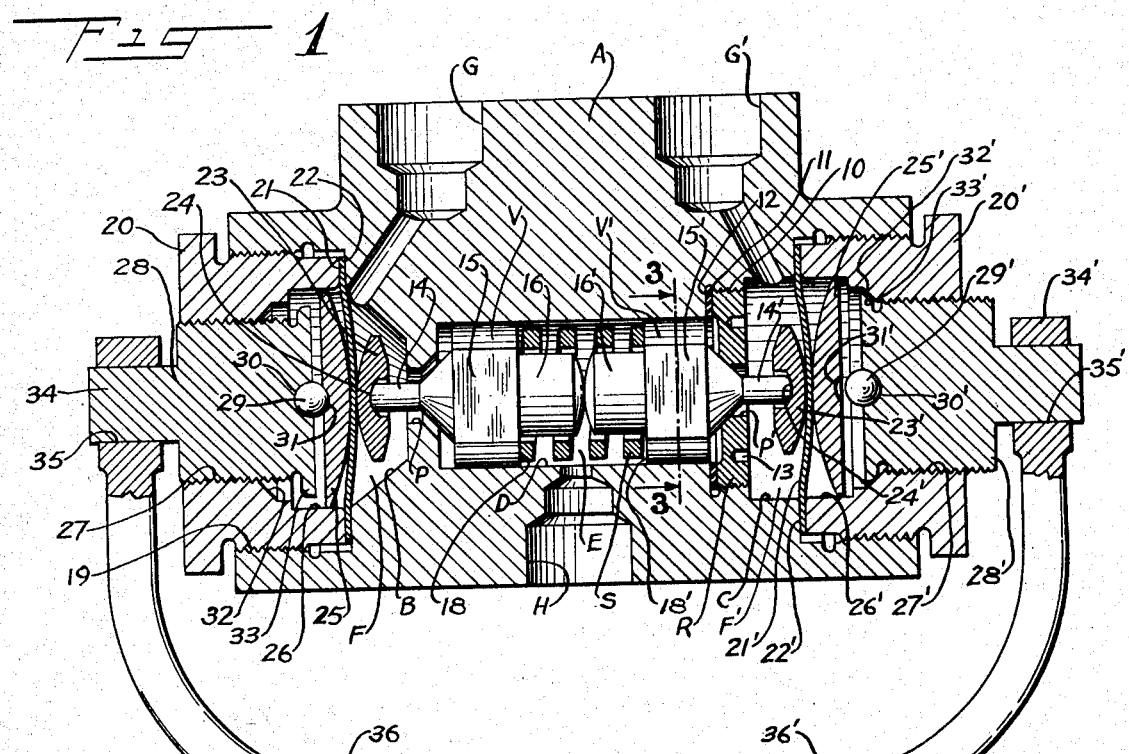
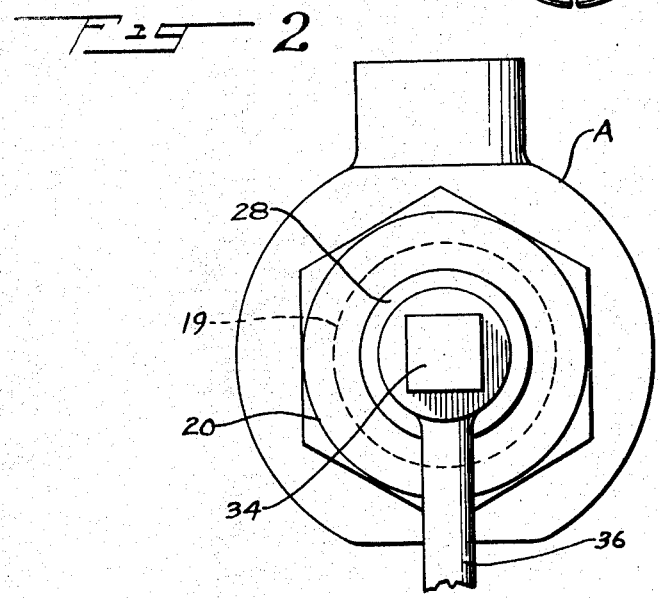
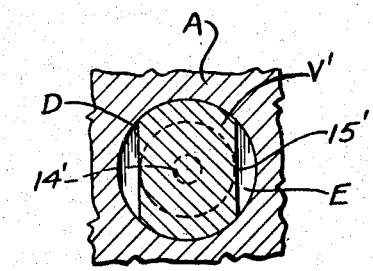
INVENTOR
WILLIAM F. McKAY.
BY
E. H. Greenewald
ATTORNEY Patented Mar. 30, 1937

2,075,740

UNITED STATES PATENT OFFICE 2,075,740

DUPLEX VALVE

William F. McKay, Maplewood, N. J., assignor, by mesne assignments, to Union Carbide and Carbon Corporation, a corporation of New York Application March 28, 1934, Serial No. 717,697

18 Claims. (Cl. 277—18)

This invention relates to improvements in valves and more particularly to an improved duplex valve for controlling the flow of fluid from separate sources to a common discharge conduit or from a single supply conduit to separate delivery conduits.

The main objects of this invention are: to provide an improved valve of the packless type; to provide a conveniently operable, compact and simple duplex valve for controlling the flow of fluid from branch conduits to a single conduit, or vice versa; and to provide a duplex valve in which the valves may be operated independently, in which each valve may be closed positively rather than by the action of a spring alone, in which both valves may be closed simultaneously, and in which one of the valves may be opened while the other valve is maintained in a closed position.

These and other objects and the novel features of this invention will become apparent from the following description and the accompanying drawing, of which:

Fig. 1 is a longitudinal cross-sectional view of a duplex valve embodying this invention;

Fig. 2 is an end view of the valve; and

Fig. 3 is a transverse sectional view of one of the valve heads, taken on the line 3—3 in Fig. 1.

One embodiment of this invention, as shown by the drawing, comprises a metal valve body A which has two axially-aligned, substantially identical cavities B and C, and a cylindrical bore D providing a chamber E between and axially in line with said cavities. The chamber E communicates through ports P, P' with chambers F and F' in said cavities, and said ports are controlled by valves V, V' mainly housed in the chamber E and operable by mechanisms located in said cavities. Branch passages G, G' and a single passage H in the body A, respectively open into the end chambers F, F' and into the intermediate chamber E,—these passages being adapted for the connection thereto of suitable conduits so that fluid may be delivered at will from either or both of the passages G, G' to the passage H, or vice versa. The passage H is preferably located midway between the ports P and P'.

The ports P, P' are axially aligned and located at the opposite ends of the chamber E. The port P is disposed centrally in a part of the body constituting a partition between the chamber E and the cavity B, and the port P' is disposed centrally in a threaded ring R secured in an internally threaded section 10 at the bottom of the cavity C. A gasket 11, held against a shoulder 12 by the ring R, seals the joint between the body and the ring. Recesses 13 in the face of the ring R may be provided to receive a wrench or other suitable tool for tightening the ring into place.

The valves V, V' are identical but face in opposite directions in the chamber E and preferably have bevelled surfaces adapted to engage correspondingly bevelled seats at the ports P, P'. The valves have stems 14, 14' which extend through the ports into the chambers F and F' respectively, and the valve heads are slidable within and guided by the bore D but are flattened or partially cut away at opposite sides, as at 15, 15', to permit the flow of fluid past the valves. Back of their heads, the valves have reduced sections or bosses 16, 16' which are encircled by a single stiff helical spring S, the opposite ends of which bear against the shoulders 18, 18' formed between the valve heads and said bosses.

The valve operating mechanisms in the cavities B and C are identical and, to simplify the description, only the mechanism in cavity B will be described in detail, like parts in the other cavity being designated by the same numerals primed. The entrance of the cavity B is internally threaded, as at 19, to receive the externally threaded bushing 20, the inner annular end of which engages the margin of an imperforate flexible circular metal diaphragm 21 and clamps the latter fluid tight against an internal shoulder 22. The diaphragm 21 (or 21') thus serves as one wall of the chamber B (or C) and, being flexible, also constitutes an element for transmitting pressure to operate the valve V (or V'). The central portion of the inner face of the diaphragm is engageable by the convex face of a pressure transmitting plate 23, the opposite face of which has a recess 24 to receive the rounded end of the valve stem 14 whereby the latter and the plate 23 are self-centering. The central portion of the outer face of the diaphragm 21 engages the convex surface of a second pressure-transmitting plate 25. The plate 25 may be of larger diameter than the plate 23 to support the diaphragm 21 when it is flexed outwardly or inwardly. The plate 25 fits within and preferably has a peripheral surface of about the same diameter as a counterbore 26 at the inner end of the bushing 20, so that the plate 25 will be slidable in and guided by the counterbore.

The bushing 20 is internally threaded, as at 27, to receive an externally threaded valve-actuating plug 28 which is rotatable and axially adjustable in the bushing to either unseat or release the valve V. The pressure exerted by adjustment of the plug 28 is applied to the plate 25 by a spherical or ball bearing 29 which seats in correspondingly shaped recesses 30, 31 in the opposed faces of the plug 28 and plate 25 and provides a slight clearance between these parts.

The bushing 20 is also counterbored between its internally-threaded section 27 and the counterbore 26 to provide a chamfered shoulder 32 which serves as a sealing seat for the edge of an annular flange 33 at the inner end of the plug 28 when the plug is in a retracted position. The outer end of the cavity B is thus safely closed off in the event of rupture of the diaphragm 21.

The plugs 28, 28' may be operated independently or together to actuate the valves V, V'. The outer end of the plug may have a square projection or key 34 to fit a keyway 35 at the end of a handle 36 which is adapted to turn the plug in either direction and thereby advance or retract the plug 28 in the bushing 20. In order that the two plugs 28 and 28' may be operated in unison to unseat one valve while closing the other, or to set both valves in an intermediate closed position, the two handles 36 and 36' may be bent toward one another and provided with matching hemispherical heads 37, 37' which are provided with aligned recesses, one of which is threaded, to receive a set screw 38 to secure the heads together and form a ball-shaped grip.

Assuming that the valve V is open and the valve V' is closed, as shown; when the two handles are swung forward as a unit, the plug 28' will be turned in a clockwise direction, viewed from the right side of the valve while the plug 28 will be turned in a counter-clockwise direction, as viewed from the opposite, or left, side of the valve. As the handles are swung through an arc of substantially 90°, pressure will be withdrawn from the valve V to permit it to seat over the port P under the force of the closing spring 17, while the plug 28' and ball bearing 29' are advanced until initial contact is made with the plate 25'. Both the valves V and V' are closed when the handles are in this intermediate position, and no fluid can flow through the passage H.

A further throw of the handles 36, 36' through another arc of substantially 90° will cause the plug 28' and ball bearing 29' to force the plate 25' against the diaphragm 21', thrusting the plate 23' against the stem of valve V' and moving the valve V' away from its seat to an open position. At the same time the boss 16' of the valve V' is moved across the chamber E where it engages the boss 16 of the valve V and firmly and positively seats the latter. The closing of the valve V by a direct axial thrust gives greater assurance of a leak-tight fit of the valve V over the port P than if the compressive action of the spring S alone were relied upon. In service, the valve may be mounted so that the axial center line of the bore D and chambers F, F' is either horizontal or vertical. When said axis is vertical, there is less possibility that the weight of the handles 36, 36' may accidentally change the setting of valves.

In the preferred construction of this valve, as shown, it is impossible for both valves to be open at the same time, since the spring S as well as the engagement of the bosses 16, and 16' force and hold one valve shut when the other valve is opened. However, by shortening the bosses 16, 16' so that there will be a substantial clearance between them and by making the spring S of sufficient strength, the handles 36 and 36' may be turned in opposite directions from their intermediate closed position to open both valves at the same time, where it is desired to simultaneously supply fluids from the branch passages G and G' to the single passage H or to supply fluid from the single passage H to the two branch passages. With the bosses thus shortened so that there is between them a clearance at least slightly greater than the aggregate length of travel of each of the valves, the handle 36' may be thrown through an arc of approximately 180° while the handle 36 remains in the position, as shown. Both of the valves will then be opened, and a complete reversal of the position of the handles is necessary to close the valves.

Although one embodiment of this invention has been illustrated and described, it will be understood that some parts of the improved valve may be used without others and various changes may be made in the construction disclosed without departing from the principles of this invention.

I claim:

1. A valve comprising a body having aligned cylindrical chambers and a coaxial port connecting said chambers; a valve in one of said chambers controlling said port and having a stem projecting through said port into the other of said chambers, a bushing secured to said body in line with said chambers; an adjustable valve-actuating element carried by said bushing; and means for transmitting pressure from said element to said valve stem comprising an imperforate diaphragm clamped to said body by said bushing and constituting a wall of the chamber into which said stem projects, the pressure-transmitting means also comprising a pair of plates, one of said plates being operatively associated with said valve stem and having a convex surface that engages one face of said diaphragm, and the other plate being operatively associated with said actuating element and having a convex surface that engages the other face of said diaphragm.

2. A valve comprising a body having aligned cylindrical chambers and a coaxial port connecting said chambers; a valve in one of said chambers controlling said port and having a stem projecting through said port into the other of said chambers, a bushing secured to said body in line with said chambers; an adjustable valve-actuating element carried by said bushing; and means for transmitting pressure from said element to said valve stem comprising an imperforate diaphragm clamped to said body by said bushing and constituting a wall of the chamber into which said stem projects, said bushing having a counterbore; and the pressure-transmitting means also comprising a pair of plates of unequal diameter, the smaller plate engaging one face of said diaphragm and being movably connected to said valve, the larger plate engaging the other face of said diaphragm and being guided by the wall of said counterbore.

3. A valve comprising a body having aligned cylindrical chambers and a coaxial port connecting said chambers; a valve in one of said chambers controlling said port and having a stem projecting through said port into the other of said chambers, a bushing secured to said body in line with said chambers; an adjustable valve-actuating element carried by said bushing; and means for transmitting pressure from said element to said valve stem comprising an imperforate diaphragm clamped to said body by said bushing and constituting a wall of the chamber into which said stem projects, said actuating element being rotatable, and the pressure-transmitting means also comprising a non-rotating plate bearing against said diaphragm and substantially the diameter of said outer chamber, and a ball bearing between said actuating element and said plate.

4. A valve comprising a body having aligned cylindrical chambers and a coaxial port connecting said chambers; a valve in one of said chambers controlling said port and having a stem projecting through said port into the other of said chambers, a bushing secured to said body in line with said chambers; an adjustable valve-actuating element carried by said bushing; and means for transmitting pressure from said element to said valve stem comprising an imperforate diaphragm clamped to said body by said bushing and constituting a wall of the chamber into which said stem projects, said actuating element being turnable and longitudinally adjustable in said bushing; and the pressure-transmitting means comprising a pair of plates, one of said plates being movably mounted on said valve stem and having a convex surface engaging one face of said diaphragm, the other plate having a convex surface engaging the other surface of substantially the entire movable portion of said diaphragm, said other plate and said actuating element having opposed recesses, and a ball bearing seated in said recesses.

5. A valve comprising a body having aligned cylindrical chambers and a coaxial port connecting said chambers; a valve in one of said chambers controlling said port and having a stem projecting through said port into the other of said chambers, a bushing secured to said body in line with said chambers; an adjustable valve-actuating element carried by said bushing; and means for transmitting pressure from said element to said valve stem comprising an imperforate diaphragm clamped to said body by said bushing and constituting a wall of the chamber into which said stem projects, said bushing having a recess with a chamfered shoulder, and said valve-actuating element having a round cornered flange adapted to contact with said chamfered shoulder to additionally seal the chamber having the valve therein when the valve is open.

6. A duplex valve comprising a body having end chambers, a third chamber and ports connecting said third chamber to said end chambers, said end chambers and third chamber being axially aligned; valves controlling said ports; and means, swingable about the axis of said chambers, for operating said valves to close either of said ports and open the other.

7. A duplex valve comprising a body having end chambers, a third chamber, and ports connecting said third chamber to said end chambers; valves controlling said ports; and means outside of said chambers for operating said valves either simultaneously or independently.

8. A duplex valve comprising a body having end chambers, a third chamber, and ports connecting said third chamber to said end chambers; valves in said third chamber for controlling said ports; and means comprising a diaphragm for operating each of said valves.

9. A duplex valve according to claim 7, in which said body has fluid passages severally opening into each of said chambers, and said valves are operable to control the fluid flow in either direction through said passages.

10. A duplex valve according to claim 7, in which one end of said third chamber is a removable ring, the central opening of which constitutes the port at that end of the third chamber, and the valve controlling said port is supported independently of said ring.

11. A duplex valve comprising a body having end chambers, a third chamber, and ports connecting said third chamber to said end chambers; valves controlling said ports; and means for operating said valves either simultaneously or independently comprising a handle consisting of two similar connectible parts.

12. A duplex valve comprising a body having end chambers, a third chamber, and ports connecting said third chamber to said end chambers; valves controlling said ports; and means for operating said valves either simultaneously or independently comprising a handle consisting of two separable and connectible halves adapted to be operated independently to unseat either valve without operating the other, and adapted to be operated as a unit to open either valve and close the other.

13. A duplex valve comprising a body having end chambers each provided with a flexible wall, a third chamber axially in line with said end chambers, and ports connecting said third chamber to said end chambers; valves in said third chamber for controlling said ports; spring means in said third chamber tending to seat said valves and close said ports; and means in said end chambers operable by movement of said wall to unseat said valves.

14. A duplex valve according to claim 13, in which said ports are located in the ends of said third chamber each adjacent one of said flexible walls, and said spring means comprises a single spring bearing against both valves.

15. A duplex valve according to claim 13, in which said valves have heads whereby they are guided axially in said third chamber, and said spring means comprises a single spring encircling a portion of each valve.

16. A duplex valve according to claim 13, in combination with means for operating such unseating means to alternately unseat said valves and with means whereby either valve is operable independently of the other.

17. A duplex valve according to claim 13, in combination with means for moving said flexible walls for unseating one valve and simultaneously releasing the other to permit said spring means to seat the latter.

18. A duplex valve according to claim 13, in which said valves have heads slidable in said third chamber, in combination with means for unseating one valve and for simultaneously releasing the other to permit said spring means and the opposing valve head to seat the latter.

WILLIAM F. McKAY.